Figure 1:
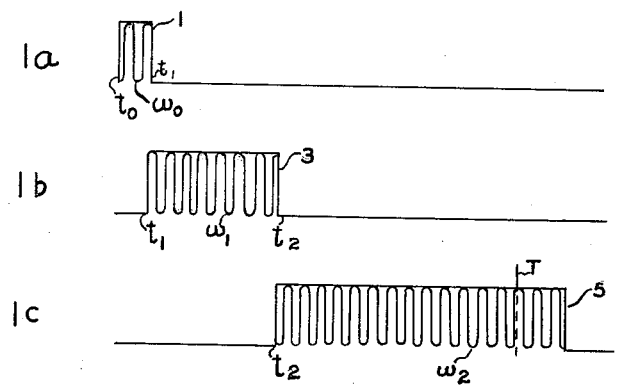

July 21, 1953  A. G. EMSLIE  2,646,562
RADIO OBJECT LOCATION SYSTEM
FOR MOVING TARGET INDICATION
Filed May 17, 1945

INVENTOR.
ALFRED G. EMSLIE
BY
ATTORNEY

Patented July 21, 1953

2,646,562

UNITED STATES PATENT OFFICE 2,646,562

RADIO OBJECT-LOCATION SYSTEM FOR MOVING TARGET INDICATION

Alfred G. Emslie, Boston, Mass., assignor, by mesne assignments, to the United States of America as represented by the Secretary of War Application May 17, 1945, Serial No. 594,265

10 Claims. (Cl. 343—9)

The present invention relates to a radio object-location system adapted to distinguish fixed objects from moving objects, and it relates more particularly to a system of this character which is adapted to eliminate undesired moving-object echoes from the indicating portion of the system.

Radio object-location systems which distinguish fixed objects from moving objects are, in general, based upon some means for obtaining reference oscillations having a fixed phase with respect to the exploratory pulses, and combining returned echo-pulses with said reference oscillations to obtain video pulses; the character of the video pulses being a function of the object velocity. Systems utilizing locally generated reference oscillations synchronized in a fixed phase relation (in coherence) to the exploratory pulses may be referred to as coherent pulse-echo systems, and the synchronized oscillator providing the reference oscillations is sometimes called a "coherent oscillator."

Successive echo-pulses returning from an object will have a certain phase relative to the reference oscillations, and the rate at which the phase of the echo-pulses changes with respect to the fixed phase reference oscillations is dependent upon the velocity of the object relative to the system (radial velocity). Echo-pulses returning from stationary objects will always have a fixed phase with respect to the reference oscillations, and will be evidenced by video pulses having a constant amplitude. Successive echo-pulses from moving objects, however, will have a progressive phase shift with respect to said reference oscillations and will be evidenced by video pulses having a cyclical variation in amplitude. A coherent pulse-echo system of this general character is more fully described in the Robert H. Dicke, Patent No. 2,535,274.

Although the distinctive appearance of moving object video pulses serves to readily distinguish moving objects from fixed objects, it is often desirable to eliminate video pulses representing stationary objects, and to present on the indicator only video pulses manifesting moving objects. This may be done by means of selective circuits which respond to the cyclical variation of video pulses representing moving objects but do not respond to the constant amplitude pulses representing fixed objects. In certain instances, however, echo-pulses from moving objects, such as clouds, may provide undesirable interference, thereby impeding the efficient operation of the radio object-location system.

It is an object, therefore, of the present invention to provide a radio object-location system of the coherent pulse type which is adapted to eliminate from the indicator video pulses representing predetermined objects moving at a particular radial velocity.

It is a further object of the present invention to provide a method whereby the radial velocity of a moving object can be determined in a simple and reliable manner.

Other objects and advantages of the present invention will become more apparent as the description proceeds, reference being had to the accompanying drawings wherein specific embodiments of the invention are shown. It is to be understood that the drawings and description are illustrative only and are not taken as limiting the invention except insofar as it is limited by the claims.

Figure 2:
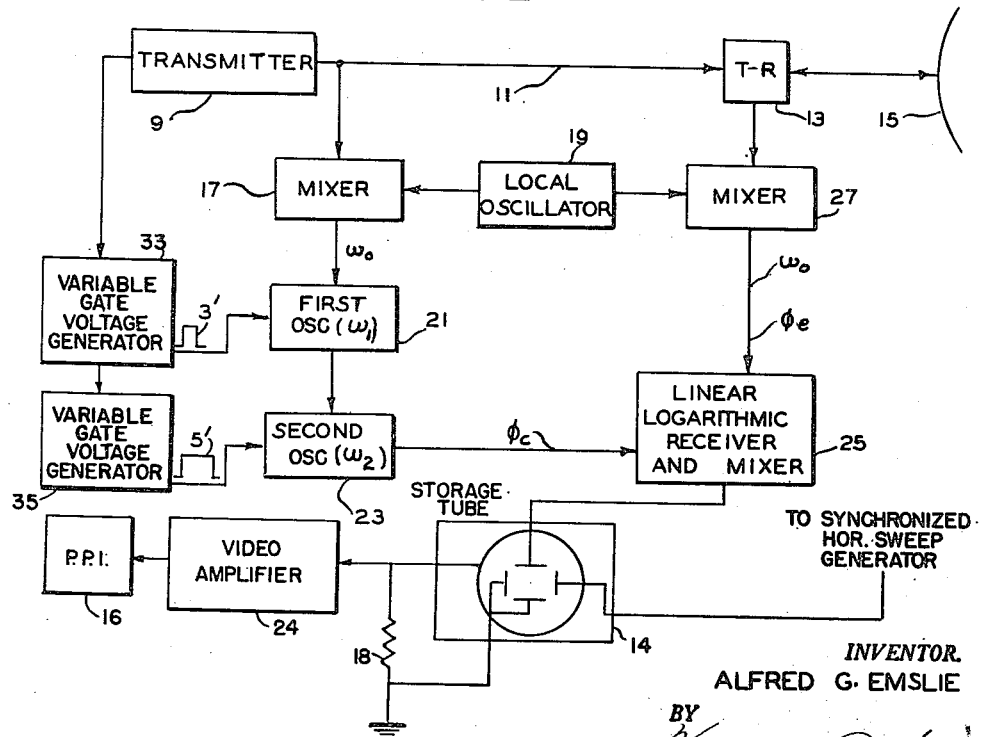

In the drawings:

Fig. 1 is a representation of certain voltage and time relations existing in the system; and Fig. 2 is a schematic diagram in block form of one embodiment of the present invention.

If it is desired to eliminate the indication of certain moving objects from the system, the phase of the reference oscillations may be continuously changed at the same rate as the phase of the undesired predetermined moving-object echo. In such an instance there is a zero relative phase shift between the reference oscillations and successive undesired echo-pulses. This method is analogous to imparting motion to the entire radio object-location apparatus, through space, at a virtual velocity equal to the radial velocity of the undesired moving object. With this method successive echo-pulses returning from fixed objects have an incremental phase change relative to the reference oscillations, and, therefore, such echoes, as well as those from objects having other than the predetermined velocity, appear on the indicator.

One method for synchronizing the reference oscillations in fixed phase relation with the transmitted exploratory pulses is to have a portion of each exploratory pulse applied as a locking (or phasing) pulse to the reference oscillator. The portion of each exploratory pulse accomplishing this function is hereinafter referred to as a locking pulse. As the reference oscillator is locked in phase (in coherence) with the transmitted exploratory pulses, the term "coherent oscillator" is used to refer to a synchronized oscillator of this character.

One method of changing the phase of the reference oscillator output, whereby the phase change is dependent only upon one variable, is to change the phase at which the oscillator locks in. In the embodiment to be hereafter described two oscillators are employed to accomplish this. A locking pulse is applied to the first oscillator, the output of which controls the starting phase of the second oscillator, the output of this second oscillator providing reference oscillations for the system. In addition, gate voltages are applied to both oscillators in order to control the time at which the output from the first oscillator phases (locks) the second oscillator.

The term "gate voltage" or "gating voltage" as here used is well known in the art, and refers to a voltage waveform having positive and negative portions of substantially rectangular waveform. The circuit producing the gate voltage may comprise a multivibrator or other electronic means and may be synchronized, or actuated, to function at a particular moment so that one set of conditions are present when the gate voltage is positive going and a different set of conditions are present when the gate voltage is negative going. It is also understood that the term "carrier-frequency," as here used, denotes the center frequency of the band of frequencies contained in each exploratory pulse and its corresponding echo-pulse.

Reference is made to Fig. 1 which shows a diagrammatic representation of the time relations of certain waveforms occurring in the embodiment shown in Fig. 2. The mathematical symbols appearing in the drawings are consistent with those of the following description.

Fig. 1(a) shows a locking pulse derived from an exploratory pulse and having intermediate carrier-frequency proportional to $\omega_0$. In the figure, waveform 1 represents the envelope of the locking pulse, Fig. 1(b) represents the gated output of the first oscillator shown in the embodiment of Fig. 2, and Fig. 1(c) represents the gated output of the second oscillator of Fig. 2. The first oscillator is adapted to operate at a frequency proportional to $\omega$, and the second oscillator is adapted to operate at a frequency proportional to $\omega_2$. In Fig. 1(b) and 1(c) waveforms 3 and 5, respectively, are the gating voltages 3' and 5' (Fig. 2) applied to the first and second oscillators, respectively. The proportional relationships mentioned above are the usual electrical ones wherein "$\omega$" equals $2\pi$ times the frequency ($\omega = 2\pi f$). In consequence, for purposes of brevity when referring to the carrier-frequency of a pulse the expression "$\omega$" will be used as being synonymous with frequency.

A variable gate voltage 3' is applied to the first oscillator so that the first oscillator has an output for a period of time corresponding to the duration of the positive portion of gate voltage 3'. A similar gate voltage 5' is applied to the second oscillator. Trailing edge ($t_2$) of gate voltage 3' is variable and coincident with leading edge ($t_2$) of gate voltage 5'. The duration of the positive portion of gate voltage 5' is dependent upon the maximum range of objects to be detected by the system. Both gate voltages are applied subsequent to the application of each successive locking (phasing) pulse applied to the first oscillator.

An analysis of the phase relations between the returning echo-pulses and the reference oscillations, and an analysis of the associated conditions necessary for proper operation of the system follows.

The carrier-frequency of returning echo-pulses is reduced to a frequency (means of doing this is more fully explained hereinafter) substantially equal to the carrier-frequency ($\omega_0$) of the locking pulse applied to the first oscillator (Fig. 2). The phase of a reduced carrier-frequency echo-pulse ($\phi_e$), reflected from an object at a range "R," is given by the expression:

(1) $$\phi_e = \omega_0 \frac{2R}{c}$$

wherein $c$ is the velocity of electromagnetic waves in space. The expression $$\frac{2R}{c}$$

may be expressed as $T$.

The phase ($\phi_c$) of the reference oscillations (output of second oscillator) at the time an echo-pulse is received from a point at a range "R" is a function of the phase of the locking pulse, the phase of the output of the first oscillator, and the phase of the output of the second oscillator. This phase relation may be more fully understood from the time relations shown in Fig. 1 and may be expressed mathematically as follows:

(2) $$\phi_c = \omega_0 t_1 + \omega_1(t_2 - t_1) + \omega_2(T - t_2) + \phi_k$$

wherein $\phi_k$ is any constant phase shift incurred in the system.

If the object is moving, the phase of the energy contained in its echo-pulses will have a rate of change given by the expression:

(3) $$\frac{d\phi_e}{dt} = \frac{2\omega_0}{c} \frac{dR}{dt}$$

$$= K v_r$$

where $v_r$ is the radial velocity of the object.

As heretofore described, in order to have video pulses from a predetermined moving object not appear on the video indicator, it is necessary that the phase of the reference oscillations change at a rate equal to the rate of change of phase of the energy contained in echo-pulses from said moving object. Therefore, in order to "stop" object motion the following relation must always be true:

(4) $$\frac{d\phi_c}{dt} = \frac{d\phi_e}{dt}$$

Inasmuch as the locking pulse is applied to the first oscillator at a time $t_1$, and as $t_1$ may be arbitrarily determined, it is apparent that $t_1$ may be considered a constant. It is further evident that $\omega_0$, $\omega_1$, and $\omega_2$ are frequency functions that also may be held constant. The time $t_2$ at which the second oscillator is phased (locked by the output of the first oscillator) is determined by the duration of the positive portion of gate voltage 3' applied to the first oscillator and the starting time $t_2$ of the positive portion of gate voltage 5' applied to the second oscillator. Attention is again directed to the fact that the trailing edge ($t_2$) of gate voltage 3' is variable, and that said trailing edge determines the occurrence of the leading edge ($t_2$) of gate voltage 5'.

The rate of phase change of the reference oscillations with respect to time is obtained by taking the first derivative of Expression 2 which is as follows:

(5) $$\frac{d\phi_c}{dt} = (\omega_1 - \omega_2) \frac{dt_2}{dt} + \frac{2\omega_2}{c} \frac{dR}{dt}$$

In accordance with the requirements of Expression 4 we may equate Expressions 5 and 3 to obtain (6) $\quad (\omega_1 - \omega_2)\dfrac{dt_2}{dt} + \dfrac{2\omega_2}{c}\dfrac{dR}{dt} = \dfrac{2\omega_0}{c}\dfrac{dR}{dt}$ Solving this expression for the rate of change of $t_2$ with respect to $t$ we have (7) $\quad \dfrac{dt_2}{dt} = \dfrac{2}{c}\left(\dfrac{\omega_0 - \omega_2}{\omega_1 - \omega_2}\right)\dfrac{dR}{dt}$
$\qquad = K' v_r$ As $t_2$ is the position of the trailing edge of gate voltage $3'$ and the leading edge of gate voltage $5'$, it is seen from Expression 7 that the rate of change of the variable gate voltage edge ($t_2$) is directly proportional to the radial velocity of the object. Furthermore, as in the instance of a moving object, the rate of change of the phase of the reflected echo-pulses relative to the fixed phase reference oscillations is periodic, the conditions of Expression 7 may be met by having $t_2$ vary in a periodic manner. This can be accomplished by making $$\dfrac{dt_2}{dt}$$

of Expression 7 a periodic linear function which can be produced electrically as an alternating voltage having a saw-tooth waveform.

From further examination of Expression 7 it is evident that the rate at which the variable gate voltage edge $t_2$ moves is different for each radial velocity.

Although in the present system it is contemplated that the rate of variation of $t_2$ will be varied for different object velocities, it can be seen that the rate of change of $t_2$ may be held constant and one of the frequencies proportional to $\omega_0$, $\omega_1$, or $\omega_2$ may be made variable. It should also be noted that in accordance with Expression 7 $\omega_1$ cannot be equal to $\omega_2$.

In view of the foregoing it is apparent that one way to "eliminate" a predetermined object having a generally constant radial velocity is to generate two gate voltages such as gate voltage 3 and gate voltage 5 of Fig. 1 where the lagging and leading edges of each gate voltage respectively are coincident and variable. Then, by means of such a control, video pulses manifesting an object moving at a constant velocity may be made to act as virtually fixed object echoes and hence be eliminated from the indicator.

Another contemplated use of this system is to provide a simple and reliable means of determining the radial velocity of a particular object relative to the transmitter. This can be accomplished by changing the rate at which variable gate voltage edge $t_2$ moves until the video pulse representing the particular object is eliminated from the video pulse indicator. By calibrating the phase shift rate control $$\left(\text{control that varies } \dfrac{dt_2}{dt}\right)$$

vs. radial velocity, a direct measurement of radial velocity may be obtained.

A description of a radio object-location system utilizing the foregoing principles follows. Reference is made to Fig. 2 wherein transmitter 9 is adapted to generate short duration, high carrier-frequency exploratory pulses of radiant energy which may be fed by suitable transmission means 11 through transmit-receive switch 13 to directional antenna 15.

Transmit-receive switch 13, which is hereinafter referred to as a T-R box, functions during the transmission of exploratory pulses to connect transmitter 9 to antenna 15 and to disconnect the rest of the circuit shown. During the period between pulses the switch functions to disconnect the transmitter from the antenna, and to connect the antenna to the receiver channel presently to be described.

A portion of each of said exploratory pulses is applied as an input to mixer 17, a second input to said mixer consisting of a continuous wave output from local oscillator 19. The beat frequency output of mixer 17 comprises a locking pulse having an intermediate carrier-frequency $\omega_0$ which is then applied to oscillator 21, the above mentioned first oscillator. The envelope 1 of this locking pulse is shown in Fig. 1(a).

Also applied to oscillator 21 from gate voltage generator 33 is gate voltage $3'$, which as heretofore described, has a variable lagging edge $t_2$ that can be displaced in time. The gated output of first oscillator 21 is applied as a phasing (locking) voltage to oscillator 23 whereby the phase of the output from first oscillator 21 determines the starting phase of second oscillator 23. From gate voltage generator 35 a gate voltage $5'$, as heretofore described, is also applied to second oscillator 23 to provide as an output therefrom reference oscillations lasting for a period of time corresponding to the time taken for echo-pulses to be returned from objects at the maximum workable range of the system. The variable phase oscillatory output of second oscillator 23 is then applied as reference oscillations to a linear logarithmic receiver, hereinafter described.

Echo-pulses received at antenna 15 are fed through T-R box 13 to mixer 27. Another input to mixer 27 consists of a second continuous wave output from local oscillator 19. The beat frequency output of mixer 27 consists of echo-pulses, having an intermediate carrier-frequency substantially equal to $\omega_0$, which are then applied as a second input to linear logarithmic receiver 25.

Linear logarithmic receiver 25 is a receiver having a linear characteristic for echo-pulses below a certain signal level and having a substantially logarithmic characteristic for echo-pulses of higher amplitude. The echo-pulses and reference oscillations are algebraically combined in a mixer which is a component of this receiver, and the resulting combination is detected to provide video pulses. The output therefrom consists of two distinct categories of video pulses. One consists of video pulses manifesting undesired moving objects, which pulses have substantially constant amplitude, whereas the second consists of those manifesting desired moving objects and stationary objects, which pulses have a periodic variation in amplitude wherein the rate of variation is a function of object velocity relative to the virtual velocity imparted to the system.

The video pulses issuing from linear logarithmic receiver 25 are applied to a video indicator which is adapted to provide indication only for video pulses having a periodic variation in amplitude. One such selective indicator is fully described in applicant's Patent No. 2,512,144.

The moving object selective video indicator may include a storage device such as an iconoscope type storage tube 14 having a beam deflection means and containing a storage mosaic. There may be many embodiments of such a device but the operation of any one is contingent upon certain fundamental characteristics of the mosaic. In brief, the mosaic consists of a dielectric plate on one side of which is a metallic coating called the signal plate, the other side of the dielectric being coated with separately insulated microscopic emissive particles that when bombarded by an electron beam emit secondary electrons. It is, therefore, evident that in effect the mosaic constitutes a myriad of small condensers, one side of each consisting of an emissive particle and the second side of which is the signal plate. A connection from the signal plate through the glass envelope to an external output terminal is provided. By connecting a load to this output terminal an output signal may be developed under certain conditions.

In brief, the action of the mosaic is as follows, and for simplicity it will be assumed that the electron beam is stationary and strikes the mosaic only at a particular point. As the electron beam strikes the mosaic, the emissive particles under the incident beam will emit secondary electrons. The result is that the number of secondary electrons emitted exceed the number of incident electrons and the emissive elements become positively charged. As a result, a corresponding negative charge is built up on the signal plate in the usual manner of a condenser.

As the emissive element becomes increasingly positive, fewer secondary electrons are released, as the positive potential draws them back to said emissive element. As a result, the number of incident beam electrons striking the emissive element equals the number of secondary electrons emitted from the element, and a state of equilibrium is reached. When such an equilibrium exists, no additional charge is acquired by the emissive elements and hence no charging current flows to supply a negative charge to the signal plate. In a somewhat similar manner, equilibrium will be reached if the electron beam is not stationary but repeatedly traces the same path on the mosaic. A more complete description of an iconoscope and of the action of a mosaic is more fully described in chapter 10 of "Television" by Zworykin and Morton, published in 1939 by John Wiley and Sons.

In the case of video pulses representing stationary objects, the electron beam will repeatedly trace the same vertical deflection path on the mosaic, and a state of equilibrium is reached. When such an equilibrium exists no additional charge is acquired by the mosaic and no charging current flows through load resistance 18 which is connected to the signal plate. For video pulses derived from moving objects, however, the electron beam will not repeatedly trace the same vertical deflection path, and as a result, new areas of the mosaic are constantly charged thereby causing current to flow through load resistance 18. Each time the electron beam charges a new portion of the mosaic a signal is developed across load resistance 18 proportional to the amount of charge. This signal appears in the form of pulses which may be then applied to video amplifier 24.

As there is a state of equilibrium reached for echoes from fixed objects and no equilibrium for echoes from moving objects, the signals applied to video amplifier 24 represent only those from moving objects. The output from video amplifier 24 may then be applied to the intensifying grid of PPI tube 16 in the normal manner. A map-like presentation showing only echoes from moving objects is thereby obtained on PPI tube 16.

While there has been here described one embodiment of the present invention employing a phase shift means including two oscillators, it will be manifest to those skilled in the art that predetermined moving objects may be eliminated in the video indicator by utilization of other phase shift techniques. It is therefore aimed in the appended claims to cover all such changes and modifications as fall within the spirit and scope of the invention.

I claim:
1. A radio object-location system including means for transmitting short duration, high carrier-frequency exploratory pulses of radiant energy, means for reducing the carrier-frequency of a portion of each exploratory pulse to obtain a locking pulse, a first oscillator, means for applying said locking pulse to said first oscillator, means for generating a gate voltage having a variable lagging edge, means for applying said gate voltage to said first oscillator to obtain a gated output, a second oscillator, means for generating a second gate voltage having a leading edge determined by the lagging edge of said first gate voltage, means for applying said second gate voltage to said second oscillator and means for applying said gated output of said first oscillator to said second oscillator as a phasing voltage, means for varying the lagging edge of said first gate voltage in a predetermined periodic manner, a mixer, and means for applying to said mixer the output of said second oscillator as reference oscillations, means for receiving echo-pulses, means for reducing the carrier-frequency of said echo-pulses to a frequency substantially the same as the carrier-frequency of the locking pulse applied to said first oscillator, means for applying said reduced carrier-frequency echo-pulses to said mixer, means for algebraically combining said reference oscillations and said reduced carrier frequency echo-pulses, and means for detecting the resulting combination to obtain video pulses, a video indicator which is responsive only to video pulses of varying amplitude, and means for applying said video pulses thereto.

2. In a radio object-location system which is adapted to eliminate video pulses manifesting moving objects of predetermined velocity, means for generating short duration, high carrier-frequency exploratory pulses of radiant energy, means for receiving echo-pulses from reflecting objects including moving objects having said predetermined velocity, means for generating reference oscillations synchronized in phase with respect to the carrier of said exploratory pulses, means for varying the phase of said reference oscillations at a rate equal to the rate of change of the phase of the carrier wave of the echo-pulses reflected by said moving objects of predetermined velocity, means for combining the carrier wave of said echo-pulses with said reference oscillations and detecting said combination to provide video pulses, means for indicating video pulses having a variation in amplitude but not responsive to video pulses having a constant amplitude, and means for applying said video pulses to said indicating means.

3. A phase shifting means including a first oscillator and a second oscillator, means for generating a gate voltage having a variable lagging edge and means for applying said gate voltage to said first oscillator to obtain a gated output therefrom, means for generating a second gate voltage, the leading edge of which is variable and determined by the lagging edge of said first-mentioned gate voltage, means for applying said second gate voltage to said second oscillator, and means for applying said gated output of said first oscillator to said second oscillator as a phasing voltage whereby the phase of the output of said second oscillator is dependent upon the position of the lagging edge and leading edge of said first gate voltage and of said second gate voltage, respectively.

4. In a radio object-location system which is adapted to distinguish certain moving objects from fixed objects and other moving objects, means for generating and transmitting short duration, high carrier-frequency exploratory pulses of radiant energy, means for generating reference oscillations synchronized in phase with respect to the carrier wave of said exploratory pulses, means for receiving carrier wave echo-pulses from reflecting objects and means for combining said reference oscillations and the carrier wave of said echo-pulses to obtain video pulses, means for varying the phase of said reference oscillations to eliminate video pulses from said certain objects, and means for indicating said remaining video pulses.

5. A radio object-location system including means for transmitting short duration, high carrier-frequency exploratory pulses of radiant energy, means for reducing the carrier-frequency of a portion of each exploratory pulse to obtain a locking pulse, a first oscillator, means for applying said locking pulse to said first oscillator for controlling the phase of the output thereof, means for generating a gate voltage having a variable lagging edge, means for applying said gate voltage to said first oscillator to obtain a gated output, a second oscillator having an output of a different frequency from the first oscillator, means for generating a second gate voltage having a leading edge determined by the lagging edge of said first gate voltage, means for applying said second gate voltage to said second oscillator and means for applying said gated output of said first oscillator to said second oscillator as a phasing voltage, means for varying the lagging edge of said first gate voltage in a predetermined periodic manner to thereby periodically vary the phase of the output of the second oscillator without varying the frequency thereof, a mixer, and means for applying to said mixer the output of said second oscillator as reference oscillations, means for receiving echo-pulses, means for reducing the carrier-frequency of said echo-pulses to a frequency substantially the same as the carrier-frequency of the locking pulse applied to said first oscillator, means for applying said reduced carrier-frequency echo-pulses to said mixer, means for algebraically combining said reference oscillations and said reduced carrier-frequency echo-pulses, and means for detecting the resulting combination to obtain video pulses, and means for indicating said video pulses.

6. A radio object-location system including means for transmitting short duration, high carrier-frequency exploratory pulses of radiant energy, means for reducing the carrier-frequency of a portion of each exploratory pulse to obtain a locking pulse, a first oscillator, means for applying said locking pulse to said first oscillator, a second constant frequency oscillator, means for causing the output of said first oscillator to vary the phase of the output of said second oscillator in a predetermined periodic manner, while maintaining the frequency of the second oscillator constant, a mixer, and means for applying to said mixer the output of said second oscillator as reference oscillations, means for receiving echo-pulses, means for reducing the carrier-frequency of said echo-pulses to a frequency substantially the same as the carrier-frequency of the locking pulse applied to said first oscillator, means for applying said reduced carrier-frequency echo-pulses to said mixer, means for algebraically combining said reference oscillations and said reduced carrier-frequency echo-pulses, and means for detecting the resulting combination to obtain video pulses, and means for indicating said video pulses.

7. In a radio object-location system for measuring the velocity of moving objects, means for generating and transmitting short duration, carrier-frequency exploratory pulses of radiant energy, means for receiving echo-pulses from reflecting objects, means for generating constant frequency reference oscillations synchronized in phase with respect to the carrier of the exploratory pulses, means for varying the phase of said reference oscillations at a rate equal to the rate of change of the phase of the carrier oscillations of the echo-pulses reflected by objects having a given velocity while maintaining the frequency of said oscillations constant, means for combining the echo-pulses with said reference oscillations and detecting said combination to provide video pulses, and means for indicating said video pulses.

8. In a radio object-location system which is adapted to eliminate video pulses manifesting moving objects of predetermined velocity, means for generating and transmitting short duration, high carrier-frequency exploratory pulses of radiant energy, means for receiving echo-pulses from reflecting objects including said moving objects having said predetermined velocity, means for generating constant frequency reference oscillations synchronized in phase with respect to the carrier of said exploratory pulses, means for varying the phase of said reference oscillations at a rate equal to the rate of change of the phase of the carrier wave of the echo-pulses reflected by said moving objects of predetermined velocity, while maintaining the frequency of said oscillations constant, means for combining the echo-pulses with said reference oscillations and detecting said combination to provide video pulses, means for indicating video pulses having a variation in amplitude but not responsive to video pulses having a constant amplitude, and means for applying said video pulses to said video indicator.

9. In a radio object-location system which is adapted to distinguish certain moving objects from fixed objects and other moving objects, means for generating and transmitting high carrier-frequency radiant energy, means for generating reference oscillations synchronized in phase with respect to said high carrier-frequency energy, means for receiving reflected carrier wave energy from objects, means for varying the phase of said reference oscillations at a rate equal to the phase variations of the carrier wave of the reflected energy, and means for heterodyning said reflected energy with said reference oscillations and detecting the combination thereof to obtain resultant voltages, means for eliminating the resultant voltages due to said certain objects, and means for indicating the remaining resultant voltages.

10. In a radio object-location system which is adapted to eliminate video pulses manifesting moving objects of predetermined velocity, means for generating and transmitting high carrier-frequency radiant energy, means for receiving reflected oscillations from objects including said moving object having predetermined velocity, means for generating constant frequency reference oscillations synchronized in phase with respect to the carrier wave of said transmitted energy, means for varying the phase of said reference oscillations at a rate equal to the rate of change of the phase of the reflected oscillations from said moving objects of predetermined velocity while maintaining the frequency of said oscillations constant, means for combining the reflected oscillations with said reference oscillations and detecting said combination to provide resultant voltages, a video indicator which is adapted to be responsive to resultant oscillations having a variation in amplitude but not responsive to video pulses having a constant amplitude, and means for applying said video pulses to said video indicator.

ALFRED G. EMSLIE.

References Cited in the file of this patent

UNITED STATES PATENTS

| Number | Name | Date |
|---|---|---|
| 2,345,932 | Gould | Apr. 4, 1932 |
| 2,209,064 | Nyquist | July 23, 1940 |
| 2,253,589 | Southworth | Aug. 26, 1941 |
| 2,406,316 | Blumlein | Aug. 27, 1946 |
| 2,435,615 | Varian | Feb. 10, 1948 |
| 2,450,945 | Eaton | Oct. 12, 1948 |
| 2,455,639 | Anderson | Dec. 7, 1948 |
| 2,517,549 | Earp | Aug. 8, 1950 |
| 2,535,274 | Dicke | Dec. 26, 1950 |

FOREIGN PATENTS

| Number | Country | Date |
|---|---|---|
| 497,147 | Great Britain | Dec. 9, 1938 |